United States Patent
Kreis et al.

(10) Patent No.: US 6,726,391 B1
(45) Date of Patent: Apr. 27, 2004

(54) FASTENING AND FIXING DEVICE

(75) Inventors: Erhard Kreis, Otelfingen (CH); Christoph Nagler, Zürich (CH); Ulrich Rathmann, Nussbaumen (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 09/638,002

(22) Filed: Aug. 14, 2000

(30) Foreign Application Priority Data

Aug. 13, 1999 (DE) .......................................... 199 38 443

(51) Int. Cl.[7] ................................................ F03B 11/00
(52) U.S. Cl. ...................... 403/28; 403/345; 415/173.1; 415/173.4; 415/174.4
(58) Field of Search .................. 415/173.1, 173.4, 415/174.4; 403/23, 28, 273, 353, 345

(56) References Cited

U.S. PATENT DOCUMENTS

| | | | | |
|---|---|---|---|---|
| 1,645,032 A | * | 10/1927 | Wilson | 403/118 |
| 3,860,358 A | | 1/1975 | Cavicchi et al. | |
| 4,177,004 A | * | 12/1979 | Riedmiller et al. | |
| 4,247,247 A | | 1/1981 | Thebert | |
| 4,472,108 A | | 9/1984 | Pask | |
| 4,551,064 A | * | 11/1985 | Pask | |
| 4,759,687 A | * | 7/1988 | Miraucourt et al. | 415/127 |
| 4,867,639 A | * | 9/1989 | Strangman | |
| 5,048,871 A | * | 9/1991 | Pfeiffer et al. | 403/118 |
| 5,071,313 A | * | 12/1991 | Nichols | |
| 5,127,794 A | | 7/1992 | Burge et al. | |
| 5,188,507 A | * | 2/1993 | Sweeney | |
| 5,197,281 A | * | 3/1993 | Przytulski et al. | |
| 5,197,853 A | | 3/1993 | Creevy et al. | |
| 5,211,534 A | * | 5/1993 | Catlow | 415/170.1 |
| 5,228,828 A | * | 7/1993 | Damlis et al. | 415/173.3 |
| 5,249,877 A | | 10/1993 | Corsmeier | |
| 5,273,396 A | | 12/1993 | Albrecht et al. | |
| 5,584,651 A | * | 12/1996 | Pietraszkiewicz et al. | |
| 5,749,701 A | * | 5/1998 | Clarke et al. | |
| 5,762,472 A | | 6/1998 | Pizzi et al. | |
| 6,126,389 A | * | 10/2000 | Burdgick | |
| 6,135,664 A | * | 10/2000 | Eckendorff | 403/13 |
| 6,302,642 B1 | * | 10/2001 | Nagler et al. | |

FOREIGN PATENT DOCUMENTS

| | | |
|---|---|---|
| CH | 660209 A5 | 3/1987 |
| DE | 1776114 | 9/1971 |
| FR | 1068598 | 6/1954 |
| FR | 2 761 119 | 9/1996 |
| GB | 2198780 A | 6/1988 |

* cited by examiner

*Primary Examiner*—Lynne H. Browne
*Assistant Examiner*—Ernesto Garcia
(74) *Attorney, Agent, or Firm*—Burns, Doane, Swecker & Mathis, L.L.P.

(57) ABSTRACT

A device for fastening and fixing components to a cylindrical wall. The cylindrical wall may be both the convex-cylindrical outer contour of a cylinder and the concave-cylindrical inner contour of a hollow cylinder, in which the component is fixed in the radial, axial and circumferential directions. The fastening and fixing is effected by shaped elements which are attached to the component and by a counterpart to each shaped element on the wall. In each case a shaped element and a counterpart interlock, such that the component has at least three shaped elements, of which at least one shaped element has a defined accuracy of fit with its associated counterpart in the radial direction and has clearance in the axial and circumferential directions. At least one shaped element has a defined accuracy of fit with its associated counterpart in the axial direction and has clearance in the radial and circumferential directions. Furthermore, at least one shaped element has a defined accuracy of fit with its associated counterpart in the circumferential direction and has clearance in the radial and axial directions.

6 Claims, 6 Drawing Sheets

FASTENING AND FIXING DEVICE

FIELD OF THE INVENTION

The invention relates to a device for fastening and fixing components to a cylindrical wall.

BACKGROUND OF THE INVENTION

In numerous technical applications, components have to be fastened and fixed to cylindrical wall contours. In the process, the components must be fixed in the radial, axial and circumferential directions. A typical example from turbomachine construction is the fastening of heat-protection shields to rotors or in casings. The object is normally achieved by virtue of the fact that shaped elements on the components to be anchored and counterparts which are made in the wall interlock and thus produce a positive-locking connection. In design terms, an attempt is made to use as few of these shaped elements as possible. A widespread solution is to fix the component in all three spatial directions with a single shaped element. However, with increasing demands on the definability of the installed position of the elements, the cost of producing such shaped elements increases considerably. For reasons of fitting (double fit, "hinge effect"), the requisite accuracy of manufacture also increases out of proportion to the installation accuracy, which ultimately also reaches its practical limit with the solution cited.

SUMMARY OF THE INVENTION

At this point, the invention proposes to separate the fixing tasks in such a way that, for each spatial direction in which fixing has to be effected, there is in each case at least one shaped element, which has a well-defined accuracy of fit with its counterpart in this direction and has ample clearance in the other spatial directions.

The essence of the invention is therefore to allocate the fixing task in different spatial directions to different fastening elements. As a result, each fastening element and its respectively associated counterpart can be produced with the requisite accuracy in precisely this spatial direction without influencing the accuracy of fit in the other spatial directions in the process. In effect, this measure results in a reduced production and assembly cost.

If necessary, the fastening may be designed so as to be secure against tilting and/or rotation by two fastening elements being arranged for one spatial direction at locations which are as far away from one another as possible in a direction perpendicular to the tilting or rotation axis. With regard to a heat-protection shield, which constitutes an essentially two-dimensional structure without a considerable extent in the radial direction, that would mean arranging two radial and/or circumferential fixings at as large an axial distance apart as possible, or two axial fixings at as large a distance apart as possible in the circumferential direction.

Likewise, precisely in connection with the fixing of heat-protection shields to rotors or in the casings of turbomachines, it may be appropriate to attach a total of three radial fastening and fixing elements in an axial section, specifically two elements situated axially on the outside, which during normal operation radially fix the component to the wall, and a center element, which has a well-defined clearance with its counterpart in the radial direction. By this embodiment, the heat-protection shield can first of all freely deform in the radial direction in order to absorb thermal expansion as far as possible in a stress-free manner. In the event of excessive radial deformation, however, there is the risk of the heat-protection shield grazing against an opposite component moving in a relative manner. The resulting frictional heat in turn provides for self-amplification of the grazing, a factor which may consequently lead to damage to an entire turboset. In this case, the center mounting limits the possible radial deformation to the size which is provided as radial clearance for this mounting.

A device for fastening and fixing a component to a cylindrical wall comprises at least three pairs of elements, each pair of elements comprising a shaped first element and a respective counterpart shaped second element, each one of the first elements interlocking with one of the counterpart second elements. The first shaped elements are adapted and configured to be attached to the component and the second shaped elements are adapted and configured to be attached to the cylindrical wall, the first and second elements adapted and configured for fastening and fixing the component to the cylindrical wall. At least one pair of first and second elements is adapted and configured for fixing the component to the cylindrical wall in the radial direction in that the first shaped element has a defined accuracy of fit with its counterpart second element in the radial direction and has a clearance in the axial and circumferential directions. At least one pair of first and second elements is adapted and configured for fixing the component to the cylindrical wall in the axial direction in that the first shaped element has a defined accuracy of fit with its counterpart second element in the axial direction and has a clearance in the radial and circumferential directions. At least one pair of first and second elements is adapted and configured for fixing the component to the cylindrical wall in the circumferential direction in that the first shaped element has a defined accuracy of fit with its counterpart second element in the circumferential direction and has a clearance in the radial and axial directions. Further, the at least three pairs of elements can comprise at least two pairs of fixation elements for fixing the component in the radial direction, said at least two pairs of fixation elements being arranged axially spaced from each other, and at least one supplemental pair of elements is arranged axially between the at least two pairs of fixation elements, and said at least one supplemental pair of elements comprising a first shaped element and a second counterpart shaped element, wherein the first element of the supplemental pair has an arbitrary clearance with the second element of the supplemental pair in the axial and circumferential directions, and has a well-defined clearance with the second element of the supplemental pair in the radial direction.

BRIEF DESCRIPTION OF THE DRAWINGS

Preferred embodiments of the invention are disclosed in the following description and illustrated in the accompanying drawings, in which.

DETAILED DESCRIPTION OF EMBODIMENTS OF THE INVENTION

The use of the invention as characterized in the claims is of course not restricted to heat-protection shields in gas turbines. Likewise, the invention permits considerably greater design scope than can be represented in the exemplary embodiment. The following explanations serve merely to illustrate the invention and not to delimit it.

Figure 1:
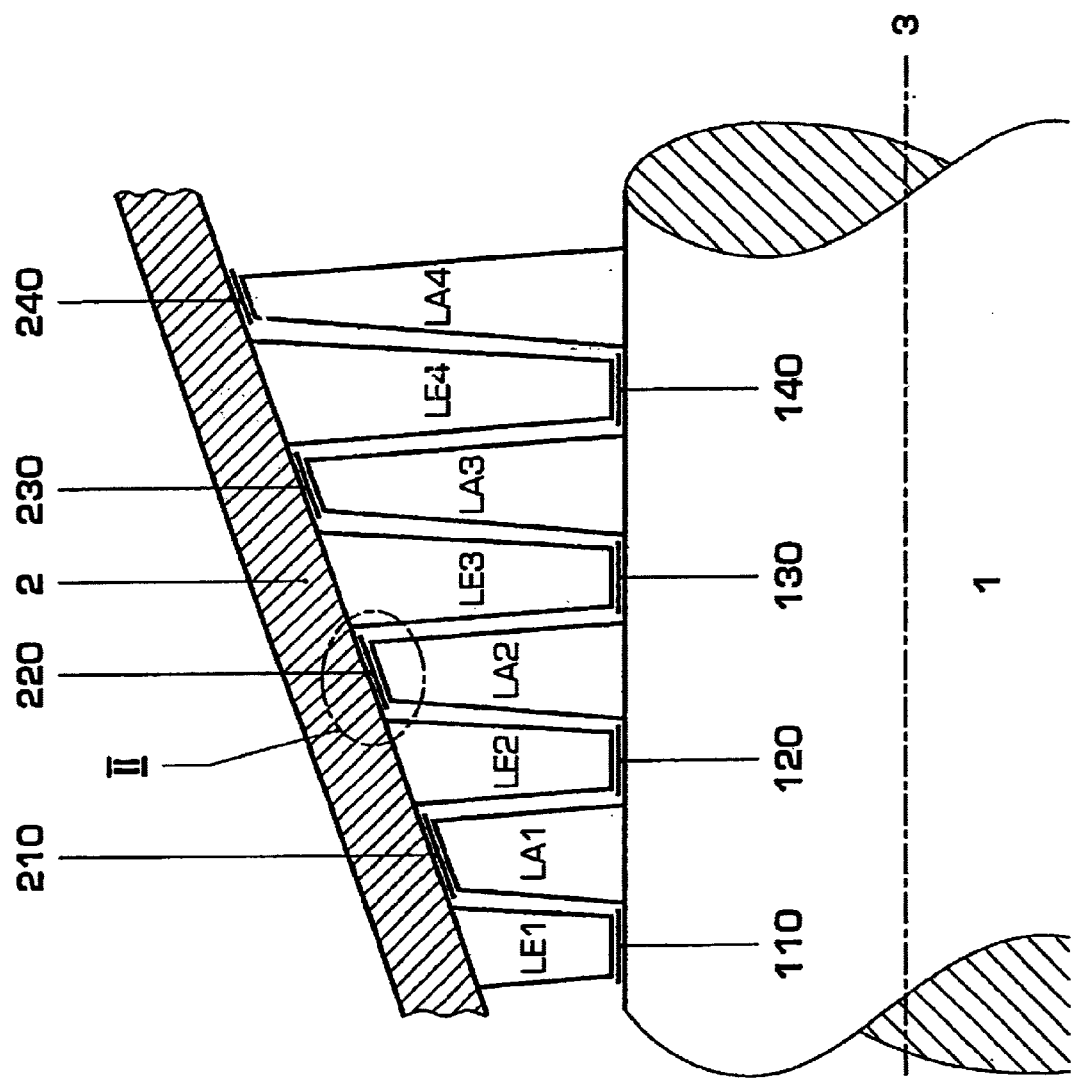
FIG. 1 shows a longitudinal section through a four-stage turbine of a gas turboset.

An axial section through a four-stage turbine of a gas turboset is shown in FIG. 1. During operation the shaft 1 rotates about the turbine axis 3. The moving blades LA1 to LA4 are arranged on the shaft 1; the associated guide blades LE1 to LE4 are fastened in the casing 2. Opposite the guide-blade tips, the rotor heat-protection shields 110, 120, 130 and 140 are fastened to the rotor by suitable fastening means. Similarly, opposite the moving-blade tips, the casing heat-protection shields 210, 220, 230 and 240 are fastened to the casing in a suitable manner. In this arrangement, in reality, heat-protection shields will not necessarily be found in every turbine stage; these heat-protection shields will often be dispensed with in practice especially in the last stages, in which the working medium has already expanded and cooled down to a considerable extent. On the other hand, the use of heat-protection shields with the fastening device according to the invention is by no means restricted to the turbine of a gas turboset. The invention may also be advantageously used, for example, in steam turbines or in turbocompressors, and in this case in particular in the high-pressure stages. Furthermore, the use of the fastening and fixing device according to the invention is by no means restricted to the anchoring of heat-protection shields in turbomachines.

Figure 2:
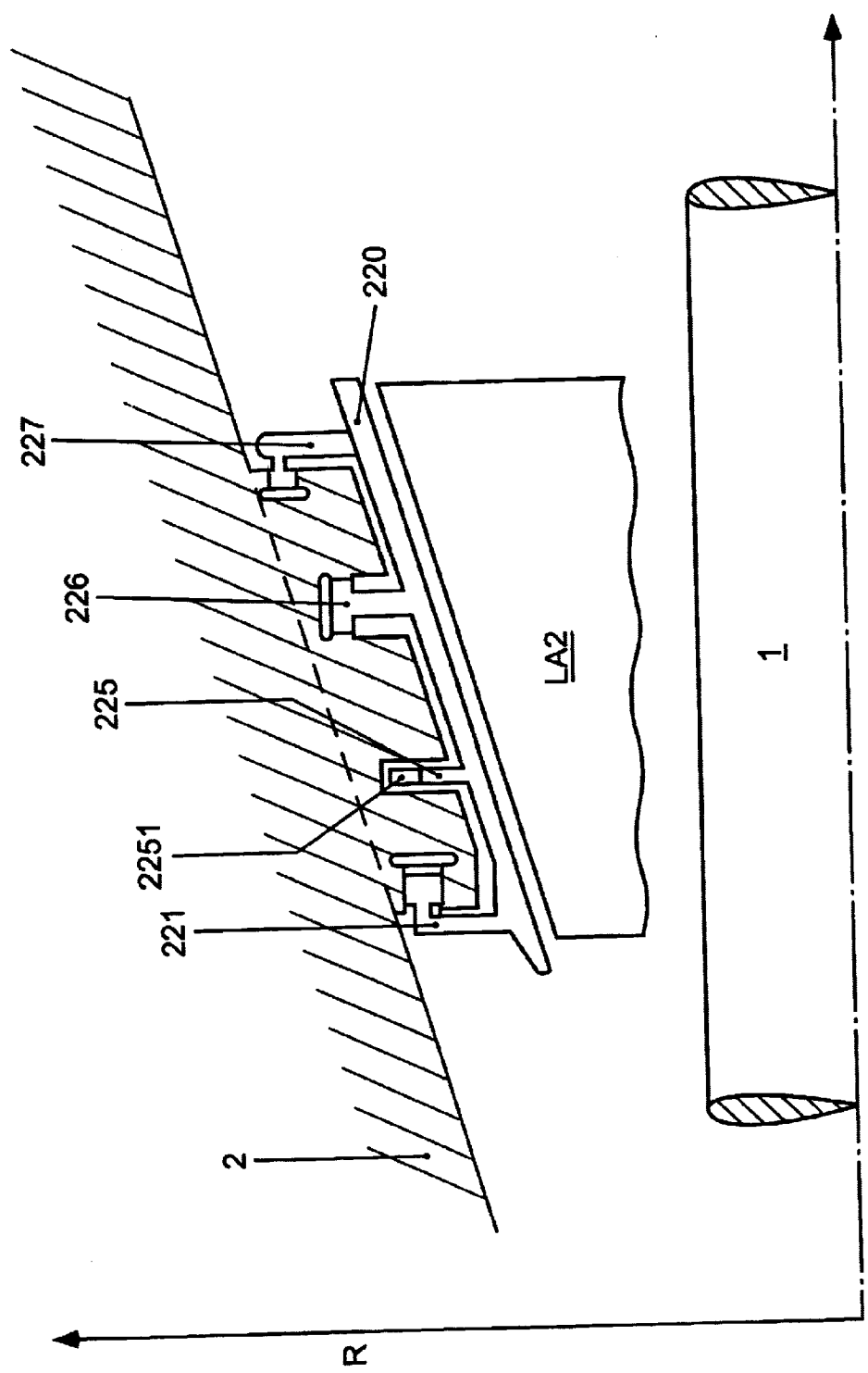
FIG. 2 shows a first embodiment of the invention on a heat-protection shield of the gas turboset in longitudinal section.

FIG. 2 shows a heat-protection shield, for example the heat-protection shield 220, with the fastening device according to the invention in detail. The heat-protection shield is provided with the fastening elements 221, 225, 227, and 226, the counterparts of which are slots in the casing 2. The relationships in the circumferential direction cannot be seen in the figure, but freely ensue from the following description. The fastening elements 221 and 227 are hooks for the radial fixing. The heat-protection shield is secured against tilting by the arrangement of two radially acting fastening elements in positions lying axially on the outside. In the axial direction and in the circumferential direction (which cannot be seen in the figure), the fastening elements 221 and 227 have a generous clearance. Therefore only the radially acting surfaces of the fastening elements and of the associated casing slots have to be machined true to size. In a similar manner, the fastening element 226 has clearance in the radial direction and the circumferential direction and fixes the heat-protection shield 220 in the axial direction. Finally, the element 225 has axial and radial clearance and acts as circumferential fixing via the surfaces 2251 in a manner not shown here.

Figure 3:
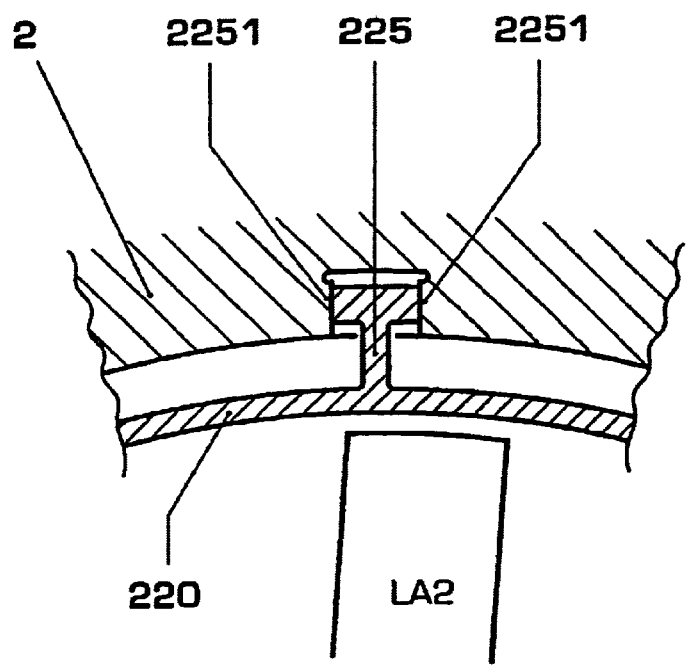
FIGS. 3 and 4 show two embodiments of the invention for the fastening of a heat-protection shield in the casing of a gas turbine in cross section.
Figure 4:
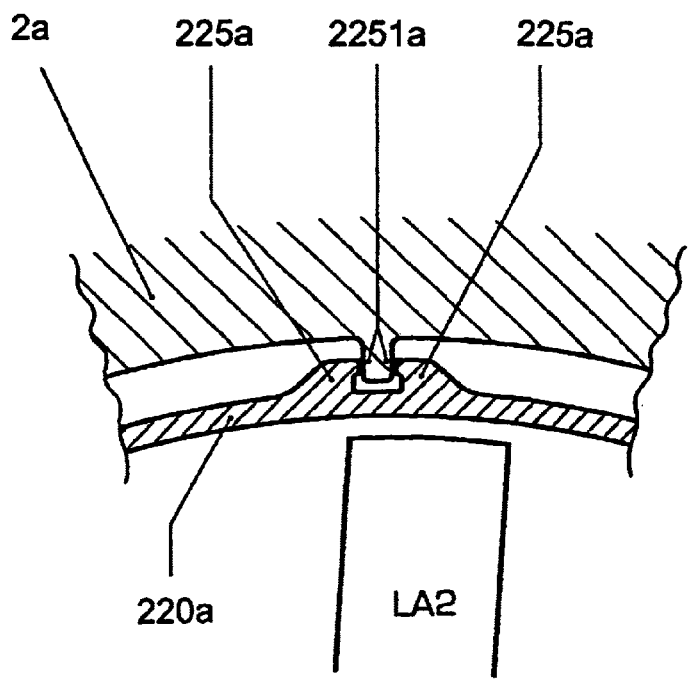

The fixing of the heat-protection shield 220 in the circumferential direction is shown in FIGS. 3 and 4 in a view in the direction of the machine axis. In the embodiment shown in FIG. 3, an element 225 engages in a slot of the casing 2 and is supported on the casing 2 via the surfaces 2251. FIG. 4 illustrates a second embodiment of the heat protection shield 220, in which the heat-protection shield is designated 220a and the casing is designated 2a. In the example shown in FIG. 4, two elements 225a form a recess in which a casing lug 21 engages, on which casing lug the heat-protection shield 220a is supported in the circumferential direction via the surfaces 2251a.

Figure 5:
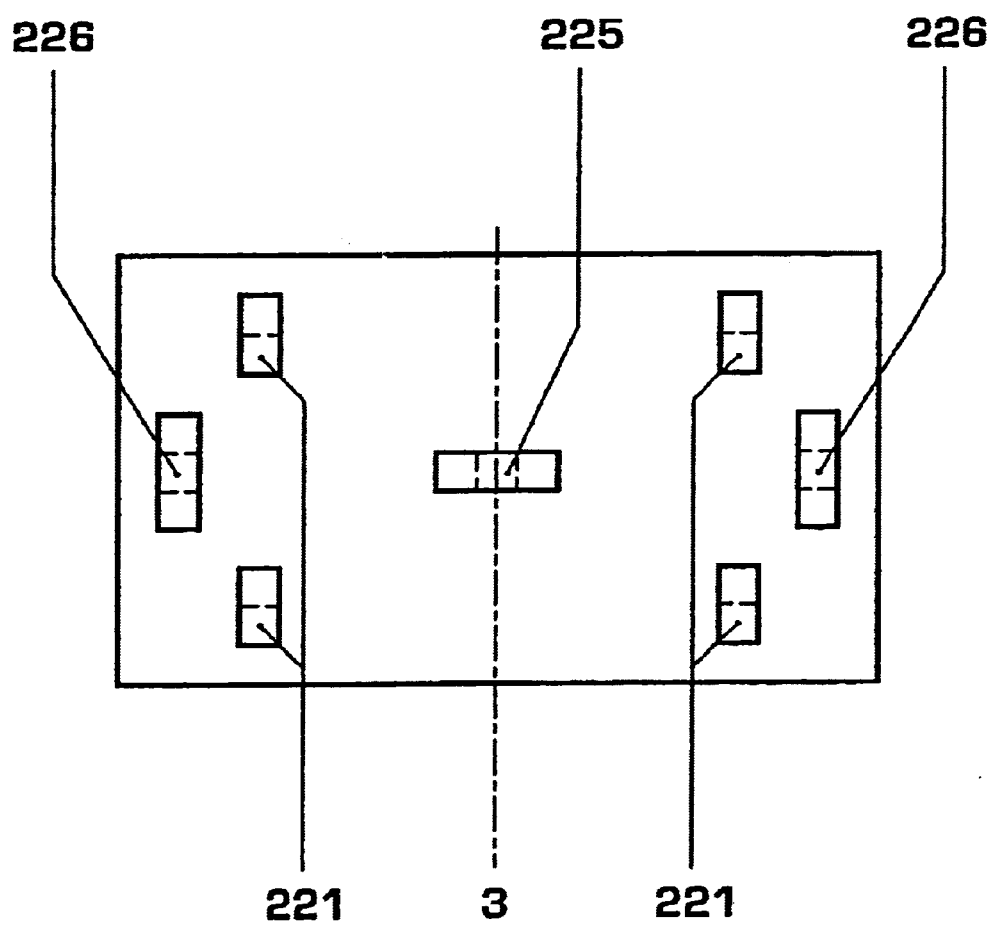
FIG. 5 shows a heat-protection shield with a fastening device according to the invention in a plan view.
Figure 5A:
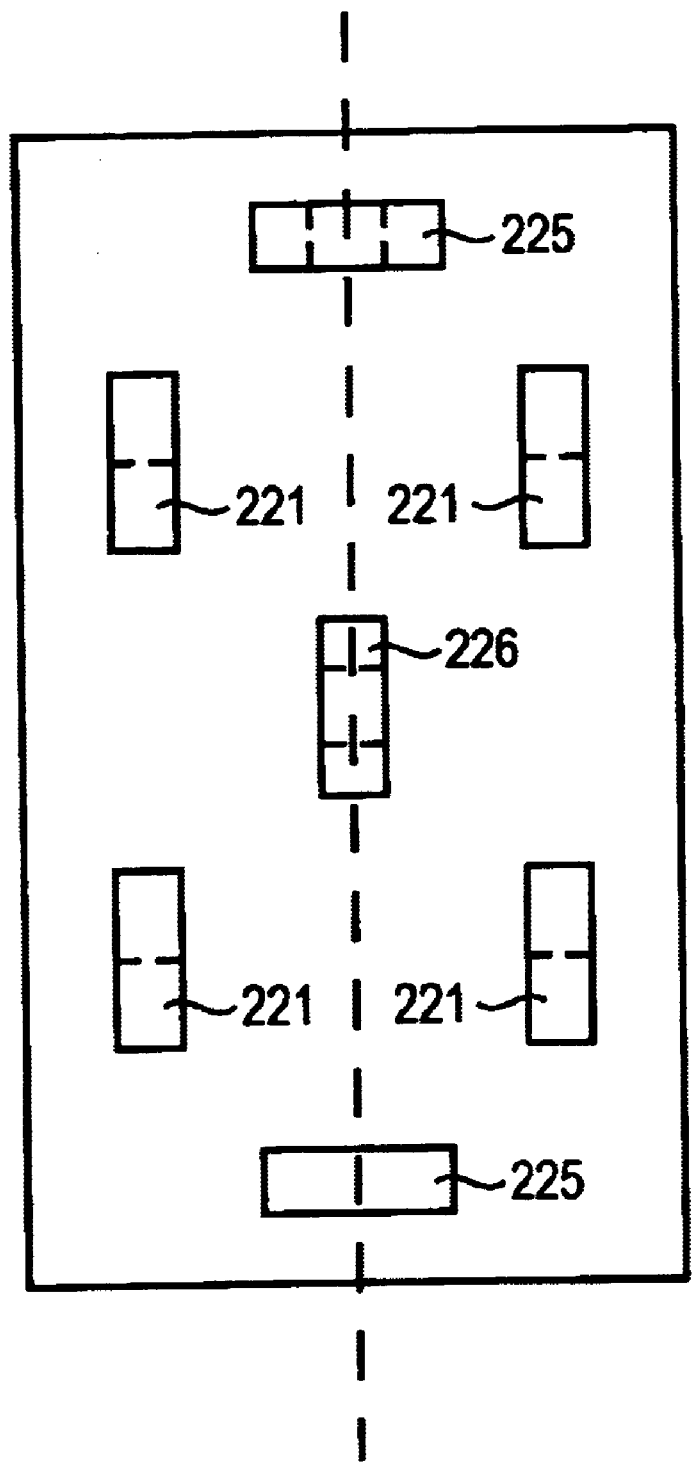
FIG. 5A shows a heat-protection shield with a fastening device according to the invention in a plan view.

A heat-protection shield with an exemplary embodiment of a fastening device according to the invention is shown in FIG. 5 in a view from the casing toward the machine axis. Four radial fastening elements 221 are arranged in the corners of the heat-protection shield. The latter is secured against tilting in the best possible manner by this arrangement. Two axial fastening elements 226 are arranged as far away from one another as possible in the circumferential direction. They fix the heat-protection shield in the axial direction and secure it against rotation. An individual element 225 for the circumferential fixing is arranged centrally. In this case, the selected arrangement of two axial fastening elements 226 and one circumferential fastening element 225 can readily be exchanged for the arrangement of one axial fastening element 226 and two circumferential fastening elements 225, in which case the latter are then to be arranged at as large an axial distance apart as possible, and the axial fastening element 226 would be advantageously attached in the center of the heat-protection shield. FIG. 5A illustrates such an embodiment having one axial fastening element 226 and two circumferential fastening elements 225. In the arrangement of a plurality of fastening elements for one spatial direction, care is preferably to be taken to ensure that they do not lie on or in the vicinity of a line in the direction in which they act. On the one hand, this would have adverse consequences on account of the known "hinge effect", that is of a double fit. On the other hand, thermal differential expansions between the component and the wall would be hindered, which, for example in heat-protection shields, would induce high internal stresses and drastically reduce the service life.

Figure 6:
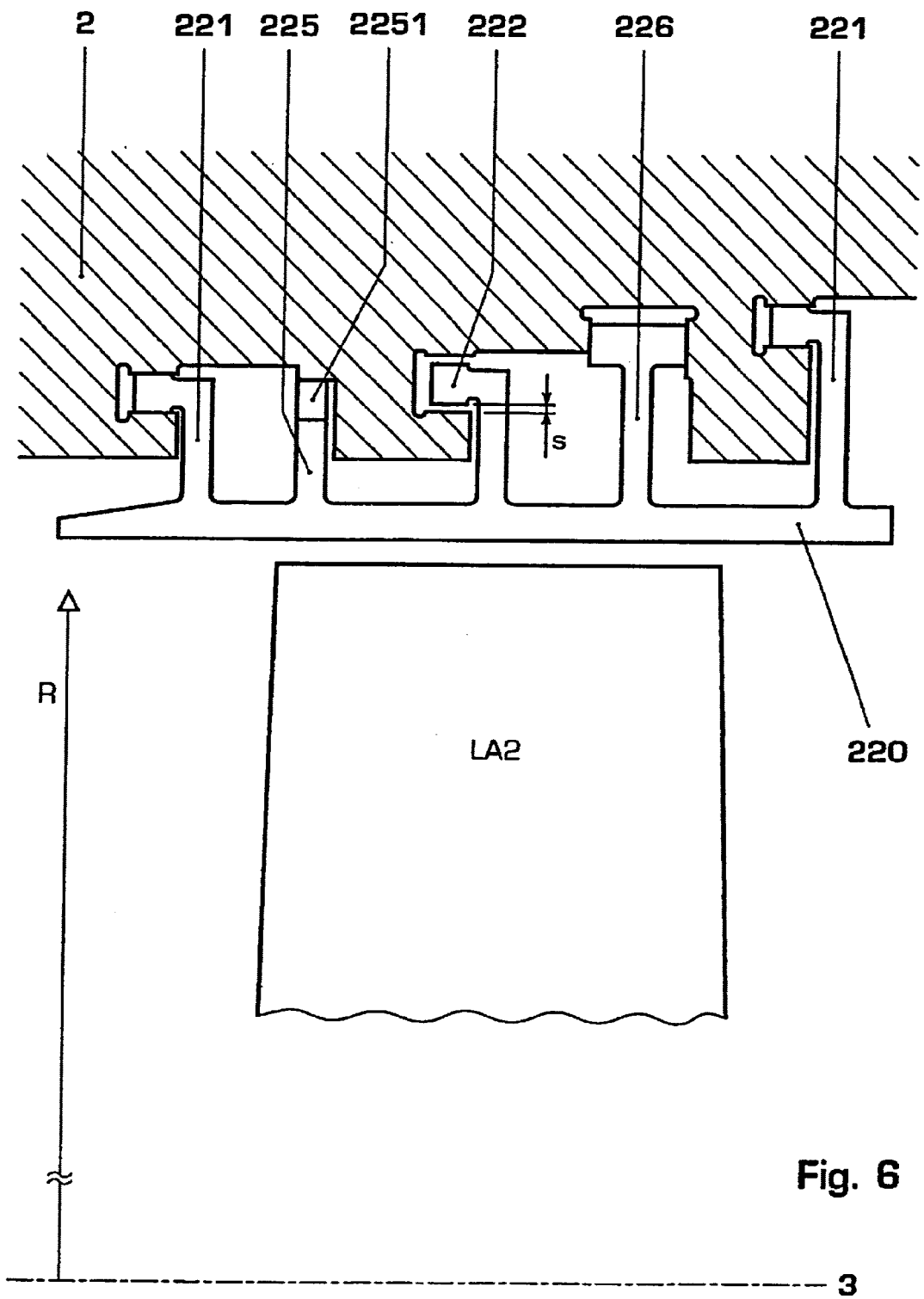
FIG. 6 shows a second preferred embodiment of the invention in longitudinal section.

A further preferred variant of the invention is shown in FIG. 6, in which the casing is designated with reference symbol 2c. This differs from that shown in FIG. 2 essentially by the fastening element 222, which has clearance in all directions and therefore apparently performs no function. It may be pointed out that the radial clearances of the element 222 is well defined, whereas the size of the clearance in the other directions is unimportant and is defined here only insofar as there has to be free mobility of the fastening element 222 in these directions. The element 222 actually only fulfills a purpose in extreme situations. This is because, in the normal case, only the axially outer elements 221 bear in the radial direction, and the heat-protection shield 220c can freely absorb deformations in the radial direction on account of thermal expansions. In the event of excessive deformation toward the blade LA2, however, a situation which puts the operating reliability at great risk may occur due to grazing. The element 222 takes effect here if the radial deformation obtains the size s, the element 222 bears in the radial direction and prevents excessive radial deformation of the heat-protection shield.

Although this invention has been illustrated and described in accordance with certain preferred embodiments, it is recognized that the scope of this invention is to be determined by the following claims.

What is claimed is:

1. A device for fastening and fixing a component to a cylindrical wall, comprising:
  at least three pairs of elements, each pair of elements comprising a shaped first element and a respective counterpart shaped second element, each one of the first elements interlocking with one of the counterpart second elements;

the first shaped elements being adapted and configured to be attached to the component and the second shaped elements being adapted and configured to be attached to the cylindrical wall, the first and second elements adapted and configured for fastening and fixing the component to the cylindrical wall;

wherein at least one pair of first and second elements is adapted and configured for fixing the component to the cylindrical wall in the radial direction in that the first shaped element has a defined accuracy of fit with its counterpart second element in the radial direction and has a clearance in the axial and circumferential directions;

wherein at least one pair of first and second elements is adapted and configured for fixing the component to the cylindrical wall in the axial direction in that the first shaped element has a defined accuracy of fit with its counterpart second element in the axial direction and has a clearance in the radial and circumferential directions; and wherein at least one pair of first and second elements is adapted and configured for fixing the component to the cylindrical wall in the circumferential direction in that the first shaped element has a defined accuracy of fit with its counterpart second element in the circumferential direction and has a clearance in the radial and axial directions.

2. The device as claimed in claim 1, wherein at least one additional pair of elements comprising a shaped first element and a respective counterpart shaped second element is adapted and configured for fixing the component to the cylindrical wall in the radial direction and is arranged at an axial distance from a first of the at least one pair of first and second elements adapted and configured for fixing the component to the cylindrical wall in the radial direction.

3. The device as claimed in claim 1, wherein at least one additional pair of elements comprising a shaped first element and a respective counterpart shaped second element is adapted and configured for fixing the component to the cylindrical wall in the circumferential direction and is arranged at an axial distance from a first of the at least one pair of first and second elements adapted and configured for fixing the component to the cylindrical wall in the circumferential direction.

4. The device as claimed in claim 1, wherein at least one additional pair of elements comprising a shaped first element and a respective counterpart shaped second element is adapted and configured for fixing the component to the cylindrical wall in the axial direction and is arranged at a circumferential distance from a first pair of the at least one pair of first and second elements adapted and configured for fixing the component to the cylindrical wall in the axial direction.

5. The device as claimed in claim 1, wherein said at least three pairs of elements comprise at least two pairs of fixation elements for fixing the component in the radial direction, said at least two pairs of fixation elements being arranged axially spaced from each other, wherein at least one supplemental pair of elements is arranged axially between the at least two pairs of fixation elements, and said at least one supplemental pair of elements comprising a first shaped element and a second counterpart shaped element, wherein the first element of the supplemental pair has an arbitrary clearance with the second element of the supplemental pair in the axial and circumferential directions, and has a well-defined clearance with the second element of the supplemental pair in the radial direction.

6. The device as claimed in claim 1 in combination with the component, the shaped first elements being attached to the component.

* * * * *